United States Patent
Ordo et al.

(10) Patent No.: US 7,497,796 B2
(45) Date of Patent: Mar. 3, 2009

(54) ELECTRO-MECHANICAL TRANSMISSION

(75) Inventors: James P. Ordo, Avon, IN (US); James A. Redelman, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 393 days.

(21) Appl. No.: 11/402,728

(22) Filed: Apr. 12, 2006

(65) Prior Publication Data

US 2007/0243965 A1    Oct. 18, 2007

(51) Int. Cl.
*F16H 3/72*    (2006.01)
(52) U.S. Cl. .......................................................... 475/5
(58) Field of Classification Search ...................... 475/5
See application file for complete search history.

(56) References Cited

U.S. PATENT DOCUMENTS

| | | | |
|---|---|---|---|
| 4,998,591 A | 3/1991 | Zaunberger | 180/6.44 |
| 5,004,060 A * | 4/1991 | Barbagli et al. | 180/6.44 |
| 5,275,248 A * | 1/1994 | Finch et al. | 180/65.6 |
| 5,722,501 A * | 3/1998 | Finch et al. | 180/6.44 |
| 5,923,498 A * | 7/1999 | Moir et al. | 360/98.08 |
| 7,217,106 B2 * | 5/2007 | Tanaka et al. | 417/410.1 |

* cited by examiner

*Primary Examiner*—Ha D. Ho

(57) ABSTRACT

A hybrid electromechanical transmission for a tracked vehicle includes a drive motor and a steer motor with separate propulsion paths to output members of the transmission. A two-speed range package is provided, including an input planetary gear set and first and second clutches. The first and second clutches are selectively alternatively engagable to establish two speed ratios between the drive motor and the remainder of the transmission. Additionally, the drive motor and the steer motor are preferably designed with a module construction, allowing for easy connection and removal for serviceability via the use of axial V-clamps.

19 Claims, 3 Drawing Sheets

PROPULSION GEARING PATH

| RANGE | C1 | C2 |
|---|---|---|
| F1 | X | |
| F2 | | X |
| N | | |
| R1 | X | |
| R2 | | X |

ELECTRO-MECHANICAL TRANSMISSION

TECHNICAL FIELD

The invention relates to electro-mechanical transmissions, especially for tracked vehicles.

BACKGROUND OF THE INVENTION

Tracked vehicles such as tanks run on endless tracks, sometimes referred to as chains, rather than on wheels. The tracked vehicles are able to turn by powering sprockets engaging tracks on one side of the vehicle at a different speed than sprockets engaging tracks on the other side of the vehicle. Typically, a propulsion motor as well as a steer motor are used to power the sprockets. Alternatively, separate propulsion motors may be used to power the opposing tracks, thereby allowing separate speed control of the tracks.

SUMMARY OF THE INVENTION

The invention provides an improved electromechanical transmission, preferably for a tracked vehicle, with a two-speed range package for torque multiplication and speed reduction, as well as independent propulsion and steer paths to improve regenerative steer efficiency and reduce steer motor size. Modular motors attached with V-clamps for ease of serviceability are provided.

The electro-mechanical transmission has an electric propulsion motor and an electric steer motor. First and second final drive mechanisms, which are interconnected via a mechanical power flow path, are operatively connected with the final drive mechanism. An input differential gear set and first and second torque-transmitting mechanisms (referred to herein as a two-speed range package) are provided. The propulsion motor is operatively connectable with the final drive mechanisms and with the input differential gear set via selective engagement of the first and second torque-transmitting mechanisms to establish first and second speed ratios across the input differential gear set.

Preferably, the first torque-transmitting mechanism is a brake selectively engagable to ground one of the members of the input differential gear set to a stationary member. The second torque-transmitting mechanism is a clutch selectively engagable to connect any two of the members of the differential gear set with one another. The first member of the input differential gear set may be continuously connected with the propulsion motor, the second member may be selectively connected with the first member via the second torque-transmitting mechanism and with the first stationary member via the first torque-transmitting mechanism. Furthermore, an output cross shaft may be operatively connected with the first and second final drive mechanisms and positioned axially therebetween such that the third member is operatively connected with the output cross shaft.

Preferably, first and second combining differential gear sets are provided to combine power flow from the steer motor and the propulsion motor. A first member of each of the first and second combining differential gear sets is continuously connected with the output cross shaft and a second member of each of the combining differential gear sets is operatively connected with the steer motors. Finally, a third member of each of the first and second combining differential gear sets is operatively connected with the first and second final drive mechanisms, respectively.

Brakes may be provided to selectively ground the third member of each of the combining differential gear sets to thereby brake the output of the transmission. Preferably a steer cross shaft is offset from a substantially parallel with the output cross shaft. The steer motor is operatively connectable with the first and second final drive mechanisms via the steer cross shaft. Efficient packaging of the drive motor and steer motor utilizing the parallel cross shaft for power transfer enables the motors to be provided as modules connectable to stationary members, such as the motor housings, via an axial clamp. The motor modules are easily removable for servicing by releasing the axial clamp.

The above features and advantages and other features and advantages of the present invention are readily apparent from the following detailed description of the best mode for carrying out the invention when taken in connection with the accompanying drawings.

DESCRIPTION OF THE PREFERRED EMBODIMENTS

Figures 1, 2:
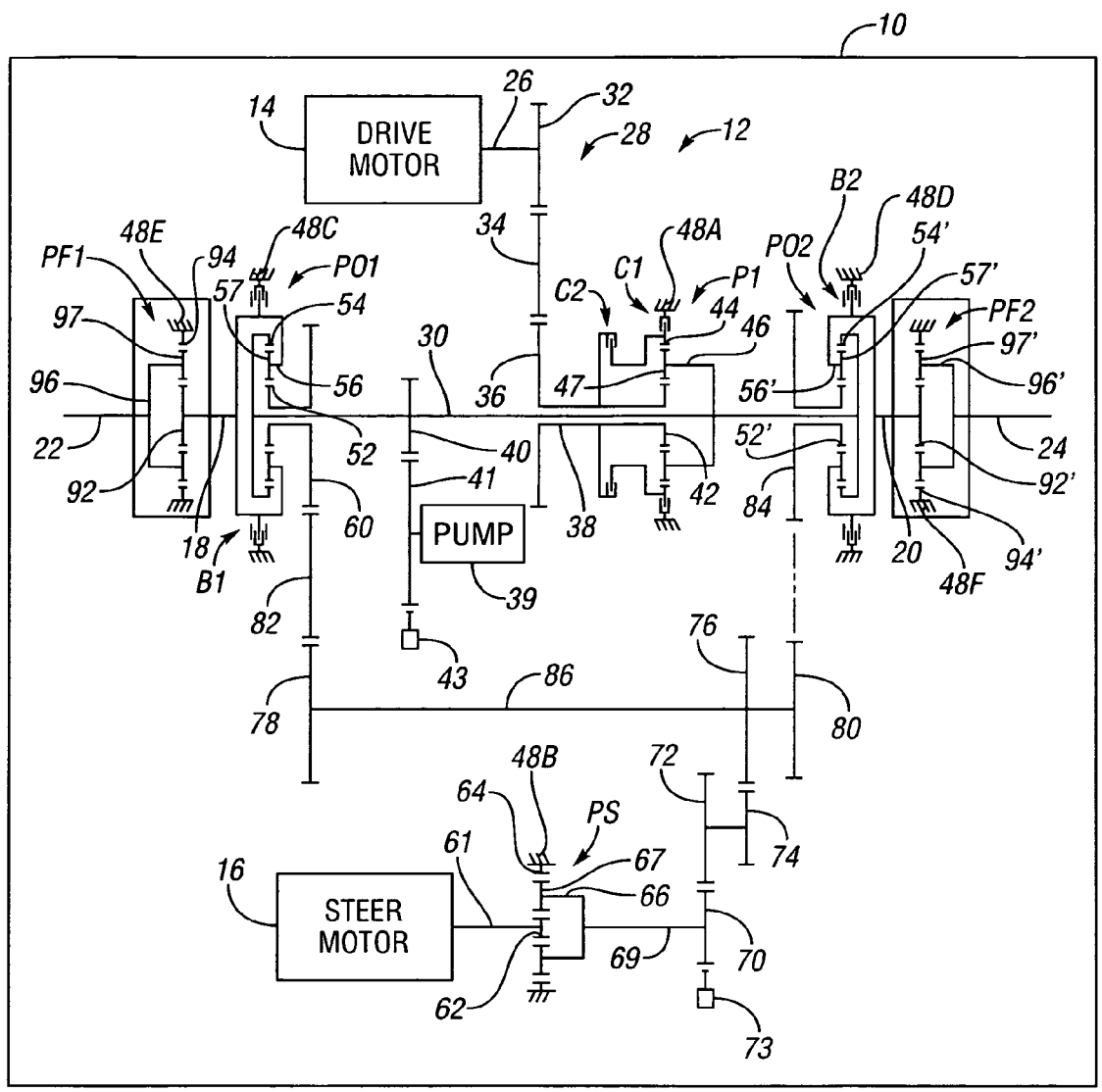
FIG. 1 is a schematic illustration of a transmission within the scope of the invention.
FIG. 2 is a truth table showing an engagement schedule of torque-transmitting mechanisms to achieve various gear ratios in the transmission of FIG. 1.

Referring to the drawings, wherein like reference numbers refer to like components, a track vehicle 10 is powered by a hybrid electromechanical transmission 12. The transmission 12 includes an electric propulsion motor 14, also referred to herein as a drive motor, as well as an electric steer motor 16, also referred to herein as a steer motor. The drive motor 14 and the steer motor 16 are each separately connected via gearing and transmission shafts, as described below, to separately power a left output member 18 and a right output member 20. Left output member 18 is operatively connected through a final drive planetary gear set PF1 to a left sprocket 22, which turns a left track (not shown), as is well understood by those skilled in the art. Likewise, the right output member 20 is operatively connected to a right final drive planetary gear set PF2 which in turn powers a right sprocket 24 to turn a right track (not shown) as is well understood by those skilled in the art.

The drive motor 14 and the steer motor 16 are preferably ultimately powered by a diesel engine which provides power to a generator which in turn provides power to a vehicle electrical buss and stores excess electrical power in a lithium battery. The drive motor 14 and the steer motor 16 draw power from the electrical buss for powering the sprockets 22, 24. The invention is not limited to a diesel engine power source; any known power source which may power a generator and any known type of battery may be used within the scope of the invention. Preferably, the drive motor 14 is operable at speeds of up to 13,000 revolutions per minute (rpm), and steer motor 16 is powerable at speeds of up to 16,000 rpm as is required to turn the vehicle 10. At least one control unit (not shown) receives operator input and controls the speeds of the motors 14, 16 as well as the direction of rotation of the motors to achieve desired mobility of the vehicle 10.

A drive motor output member 26 transfers power through a three gear transfer train 28, through an input planetary gear set P1, to an output cross shaft 30. The three gear transfer train 28, also referred to herein as the drive motor transfer train, includes gear 32, idler gear 34 and gear 36. Gear 32 intermeshes with gear 34 which in turn intermeshes with gear 36, gear 36 thereby rotating in the same direction of rotation as gear 32. Gear 36 is connected via a sleeve shaft 38 to a sun gear member 42 of the input planetary gear set P1 which also includes a ring gear member 44 and a carrier member 46 which rotatably supports a set of pinion gears 47 that intermesh with both the ring gear member 44 and the sun gear member 42. The carrier member 46 is connected for common rotation with the output cross shaft 30. The sleeve shaft 38 and the sun gear member 42 rotate and are coaxial with the output cross shaft 30.

A first torque-transmitting mechanism, clutch C1, is selectively engagable to ground the ring gear member 44 to a stationary member, a portion of transmission casing 48A. With the ring gear member 44 held stationary by application of C1, a first gear ratio will be realized across the planetary gear set P1.

A second torque-transmitting mechanism, clutch C2, is selectively engagable to connect the ring gear member 44 with the sun gear member 42. When the ring gear member 44 and the sun gear member 42 are interconnected, they rotate at the same speed. When any two members of a planetary gear set rotate at the same speed, all three members (i.e., the ring gear member 44, the sun gear member 42 and the carrier member 46) rotate at the same speed. In this configuration, the planetary gear set P1 is said to be in direct drive with a second gear ratio across planetary gear set P1 of 1.00.

The input planetary gear set P1, the first torque-transmitting mechanism C1 and the second torque-transmitting mechanism C2 may be referred to as a two-speed range package. A first (low) gear ratio achieved by applying the clutch C1 creates a ratio step with respect to a second gear ratio (high) achieved by releasing the clutch C1 and applying the clutch C2. The selected ratio step allows torque at the sprockets 22, 24 to remain constant before and after the shift. In other words, although after the shift the speed of the motor 14 will be decreased, power from the motor is constant so that torque from the motor will increase. Therefore, power at sprockets 22, 24 remains constant.

The output cross shaft 30 is connected at either end to first and second combining planetary gear sets P01 and P02, respectively. The planetary gear sets P01 and P02 are referred to as combining planetary gear sets because, as will be discussed in further detail below, power from both the drive motor 14 and the steer motor 16 are combined through the planetary gear sets P01 and P02 for output at the left and right output members 18, 20 respectively. The planetary gear set P01 includes a sun gear member 52, a ring gear member 54 and a carrier member 56 which rotatably supports a set of pinion members 57 which intermesh with both the ring gear member 54 and the sun gear member 52. The output cross shaft 30 is continuously connected with the ring gear member 54. The carrier member 56 is continuously connected with the left output member 18. The sun gear member 52 is connected for rotation with gear 60. Gear 60 is operably connected to and receives power from the steer motor 16 as will now be described. Specifically, a steer motor output member 61 is continuously connected with a sun gear member 62 of steer motor planetary gear set PS. Steer motor planetary gear set PS also includes a ring gear member 64 which is continuously grounded to stationary member 48B as well carrier member 66 which rotatably supports a plurality of pinion gears 67 which intermesh with the ring gear member 64 and the sun gear member 62. Carrier member 66 is connected for rotation with transfer shaft 69 which rotates and is connected for rotation at the same speed as gear 70. A speed sensor 73 may be placed adjacent to gear member 70 to sense the speed thereof, thereby allowing a determination of the speed of the steer motor 16 through calculation of the speed of the gear ratio across the planetary gear set PS, as understood by those skilled in the art.

The gear 70 is a member of the steer gear transfer train which also includes gear 72, gear 74, gear 76, gear 78, gear 80, gear 82 and gear 84. Gear 70 intermeshes with gear 72 which rotates at the same speed as gear 74. Gear 74 intermeshes with gear 76 which rotates at the same speed as gears 78 and 80 to which it is connected for common rotation by gear cross shaft 86. Gear 78 intermeshes with gear 82 which in turn intermeshes with gear 60. At the opposing end of the steer cross shaft 86, gear 80 intermeshes with gear 84, as indicated by the dash lines therebetween. Because gear 78 and 80 rotate at the same speed and in the same direction, gear 82 acts as an idler gear to change the direction of rotation of gear 60 with respect to gear 84. Gear 84 is connectable for common rotation with sun gear member 52' of the second combined planetary gear set P02. The output cross shaft 30 is continuously connected with a ring gear member 54' of the planetary gear set P02. Carrier member 56' upon which pinion gears 57' are connected for rotation (pinion gears 57' intermesh with both the sun gear member 52' and the ring gear member 54') and the carrier member 56' is continuously connected with the right output member 20. Thus, because the gear 84 rotates in a different direction from the gear 60, and because the drive motor 14 provides propulsion power through gear set P1 to both the ring gear members 54 and 54', the speed of the left output member 18 may be varied with respect to the speed of the right output member 20, as will be readily understood by those skilled in the art. By varying the respective speeds of the output members 18, 20, tracks connected to sprockets 22, 24 rotate at different speeds with respect to one another, resulting in turning of the vehicle 10.

The first combining planetary gear set P01 is circumscribed by a brake B1 which is selectively connectable with stationary member 48C (which also circumscribes the combining planetary gear set P01) to ground the carrier member 56 and thus stop rotation of the output member 18. The combining planetary gear set P01 is thus contained within a brake cavity formed by the stationary member 48C and the brake B1.

The second combining planetary gear set P02 is connected in symmetrical fashion with respect to the first combining planetary gear set P01. The brake B2 selectively grounds the carrier member 56' to stationary member 48D to thereby prevent rotation of output member 20. The planetary gear set P02 is contained within a brake cavity formed by the circumscribing stationary member 48D and brake B2. Preferably, the brakes B1 and B2, as well as the clutches C1 and C2 are internal, wet torque-transmitting mechanisms controlled via an electronic control unit that selectively applies hydraulic fluid to engage and disengage the torque-transmitting mechanisms.

A final drive planetary gear set PF1 also referred to herein as a first final drive mechanism, is operatively connected between the left output member 18 and left sprocket 22. The first final drive planetary PF1 includes a sun gear member 92 that is connected for common rotation with the output member 18. The planetary gear set PF1 further includes a ring gear member 94 which is continuously connected with stationary member 48E. A set of pinion gears 97 are rotatably supported on a carrier member 96 which is continuously connected for common rotation with the left sprocket 22. The pinion gears 97 intermesh with both the ring gear member 94 and the sun gear member 92. Similarly, another final drive mechanism, also referred to herein as the second final drive planetary gear set, PF2 is connected between the right output member 20 and the right sprocket 24. The sun gear member 92' is continuously connected for common rotation with output member 20 and the ring gear member 94' is continuously grounded to stationary member 48F. A plurality of pinion gears 97' are rotatably supported on carrier member 96' and intermesh with both the ring gear member 94' and the sun gear member 92'. The carrier member 96' is continuously connected for common rotation with the right sprocket 24.

The output cross shaft 30 is used to drive an output pump 39. Specifically, gear 40 is connected to and rotates with the output cross shaft 30. Gear 40 intermeshes with gear 41 which is continuously connected with the output pump 39. Return of the gears 40 and 41 drives the pump 39, providing lubricating and cooling fluids to the gear members and the motors 14, 16 within the transmission 12. A first speed sensor 43 is positioned to sense the rotational speed of gear 41, thus providing an indication of rotational speed of the output cross shaft 30 as well as speed and output potential of the pump 39.

Thus, propulsion power from the drive motor 14 is combined with steer power from the steer motor 16 at the combining planetary gear sets P01 and P02. Specifically, propulsion power from the drive motor 14 flows along the three gear transfer train 28 to the input planetary gear set P1 at the sun gear member 42. The steer power from the steer motor 16 flows through the steer planetary gear set PS through gears 70, 72, 74, and 76 along the steer cross shaft 86 to gear 78 and 80, from gear 78 to gear 82 through gear 60 to the sun gear member 52. Power from gear 80 is transferred to gear 84 to the sun gear member 52' of planetary gear set P02. The power from the drive motor 14 flows through the input planetary gear set P1 and is supplied at the carrier member 46 at a reduction gear ratio when clutch C1 is engaged or at a direct drive ratio when clutch C2 is engaged and flows to the ring gear members 54 and 54' of the combining planetary gear set P01 and P02, respectively. This gearing arrangement, in which propulsion and steer power is combined at the planetary gear set P01 and P02 allows high power density and supports a mechanical regenerative to steer system. For example, during a relatively severe turn at high speeds, torque on the inner sprocket (i.e., sprocket 22 or sprocket 24 which is in the direction of the turn) may be counter to the intended direction of drive torque. That is, the sprocket resists propulsion. Because the sprockets 22 and 24 are interconnected via an entirely mechanical path (i.e., gears, torque-transmitting mechanisms and shafts), when this occurs, the drive motor 14 and steer motor 16 may be independently controlled at speeds that allow the vehicle speed and turn radius requested by the driver. A transfer of power from the resistive inner sprocket to the outer sprocket is required to maintain desired vehicle performance. The excess power is transferred from the inner track to the outer track mechanically through the output cross shaft 30. The mechanical transfer of power from the inner track to the outer track is more efficient than transfer in a transmission designed using separate electric wheel motors: in a wheel motor design, in order to provide a regenerative steer system, power transfer from an inner wheel motor (i.e., a wheel motor at the inner track) would have to be converted to electrical power and then back into mechanical power at the outer motor (i.e., a wheel motor at the outer track). Electrical losses are inevitably associated with the transfer of power from mechanical form to an electrical form and back to a mechanical form again, as is readily understood by those skilled in the art.

The torque multiplication of the two-speed range package (i.e., the input planetary gear set P1 and the clutches C1 and C2) allows vehicle low speed, high load performance points to be achieved with lower drive motor torque. This allows a smaller drive motor 14 to be employed. At required vehicle low speed, high load performance points, drive motor speed is reduced over the input planetary gear set P1 while torque is multiplied. This allows the smaller drive motor 14 to operate a higher speed and lower torque condition, increasing motor efficiency and reducing vehicle cooling system requirements.

Referring to FIG. 2, four separate speed ratios may be established along the propulsion gearing path (i.e., from the drive motor 14 to the sprockets 22 and 24). A first fixed forward speed ratio F1 is established with the engagement of the clutch C1. A second fixed forward speed ratio F2 is established with the engagement of the clutch C2 to establish a higher gear ratio. When the drive motor 14 is controlled to rotate in an opposing direction, a reverse ratio R1 is established with the engagement of clutch C1 equal in value but opposite in direction to the forward ratio F1. Similarly, when the clutch C2 is engaged, a reverse ratio R2 is established equal in value but opposite in direction to the forward ratio F2.

Figure 3:
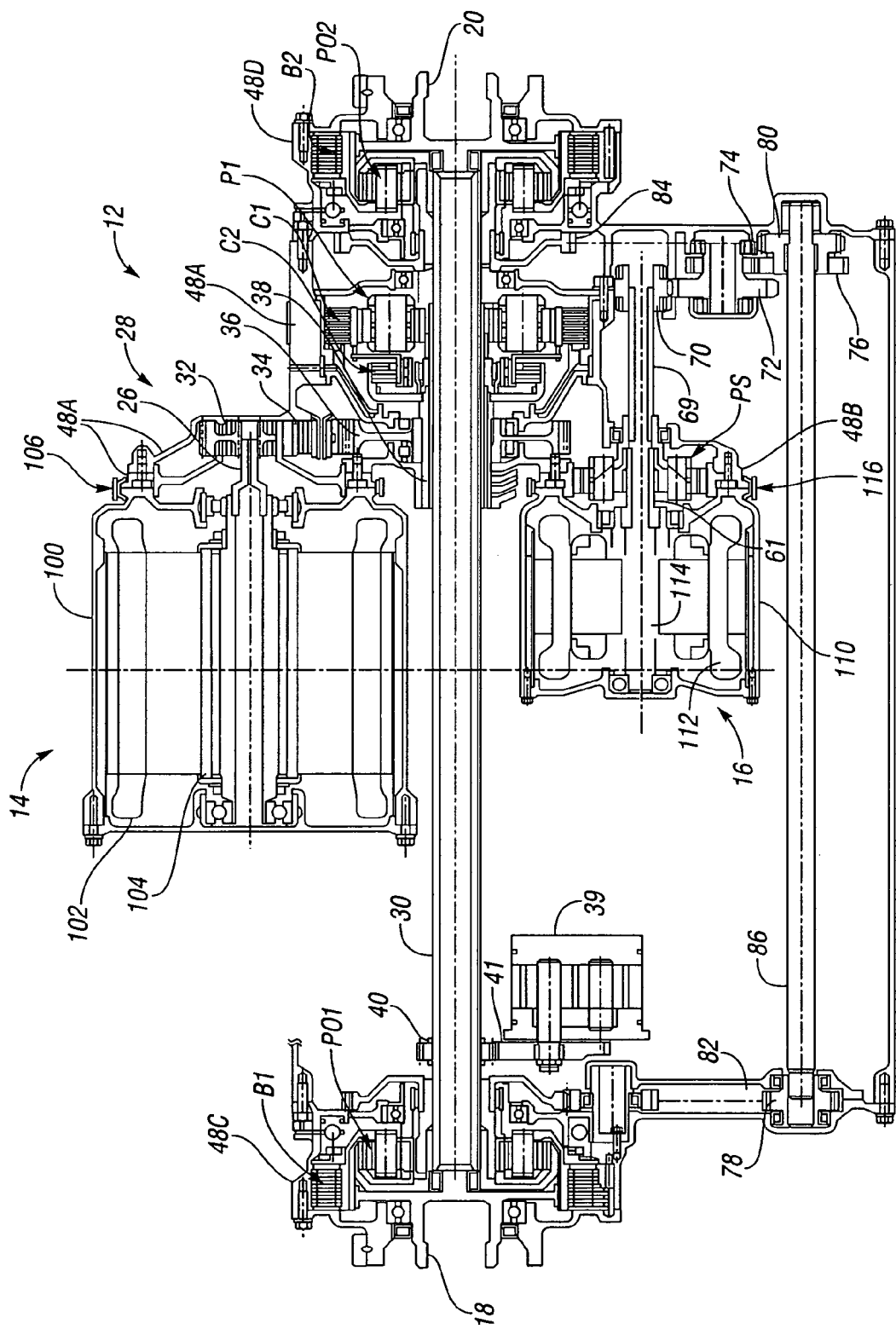
FIG. 3 is a schematic cross-sectional illustration of the transmission of FIG. 1 (not showing final drive mechanisms)

Referring to FIG. 3, a cross-sectional schematic illustration of the motors 14 and 16 and the planetary gear sets P01, P02, P1 and PS is shown. Cross shafts 30 and 86 are substantially parallel. Various gears discussed above with respect to FIG. 1 are labeled. A propulsion power flow path begins at the drive motor 14, and moves through the intermeshing gears 32, 34 and 36, along the sleeve shaft 38 to the input planetary gear set P1 to the axial cross shaft 30 and then through the combining planetary gear set P01 and P02 to the output members 18 and 20, respectively.

It is apparent from FIG. 3 that the drive motor 14 and the steer motor 16 are positioned to allow accessible space on the left sides thereof. The motors are positioned so that their respective output members, 26 and 61, are easily piloted on for connection with the three gear transfer train 28 (in the case of the drive motor 14) and with the steer planetary gear set PS in the case of the steer motor 16.

The drive motor 14 and the steer motor 16 are designed as motor modules which are easily connectable and disconnectable to the remainder of the transmission 12 for servicing. Specifically, the drive motor 14 is a motor module that includes a motor housing 100, a stator portion 102 connected to the motor housing 100 and a rotor portion 104 connected for common rotation with the motor output member 26. An axial V-clamp 106 is sized to circumscribe abutted portions of the motor housing 100 and stationary member 48A. When the axial V-clamp 106 is tightened, the motor housing 100 is secured to the stationary member 48A. Similarly, the steer motor 16 is designed as a module including the motor housing 110. A stator 112 secured with respect to the motor housing 110 and as a rotor 114 is continuously connected with the motor output member 61 for rotation therewith. The motor housing 110 abuts the stationary member 48B. An axial V-clamp 116 is sized to circumscribe the abutting motor housing 110 and stationary member 48B. When the axial V-clamp 116 is tightened, the steer motor 16 is secured with respect to the stationary member 48B. Alternatively, the axial V-clamp 116 may be loosened to allow removal of the steer motor 16 for servicing.

Figure 4:
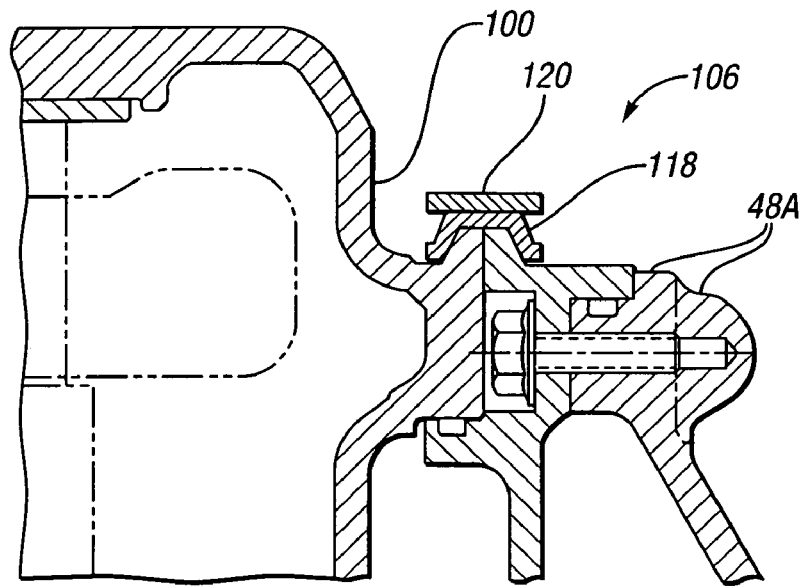
FIG. 4 is a fragmentary cross-sectional view of a portion of the transmission of FIG. 3, illustrating a V-clamp.

Referring to FIG. 4, a portion of the interconnected motor housing 100 and stationary member 48A are shown secured with the axial V-clamp 106. The axial V-clamp 106 includes an inverted V-shaped sleeve portion 118, as well a band portion 120. Tightening of the band portion 120 secures the inverted V-shaped sleeve portion 118 to clamp the motor housing 100 and stationary member 48A to one another.

Figure 5:
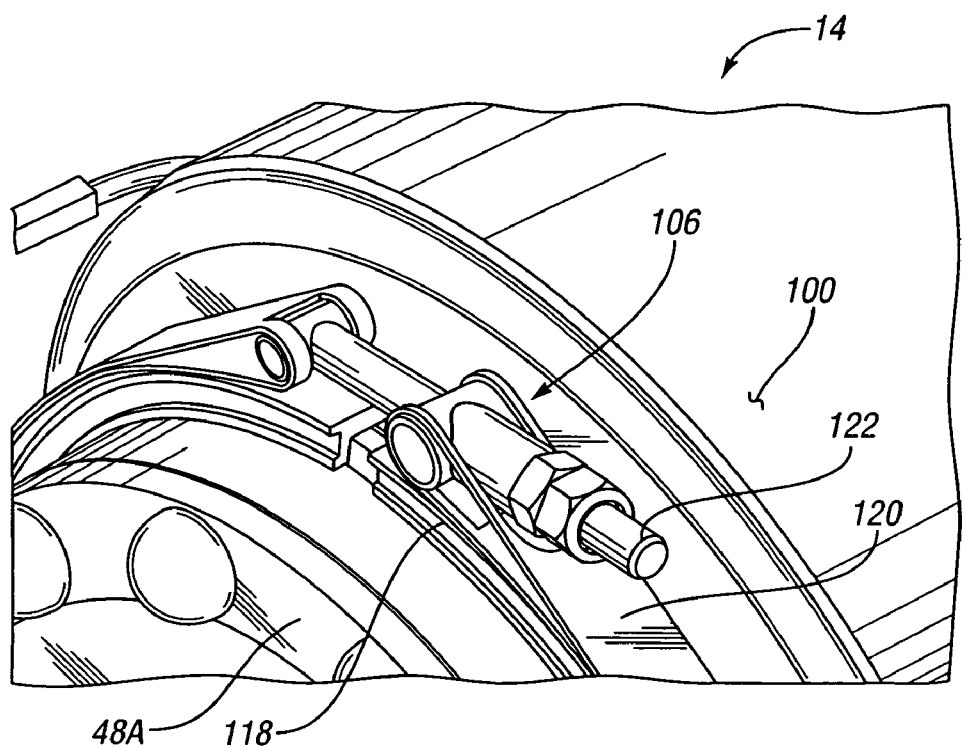
FIG. 5 is a schematic perspective view of the V-clamp of FIG. 4.

Referring now to FIG. 5, a perspective view of the axial V-clamp 106 illustrates that the band portion 120 tightens the V-shaped sleeve portion 118, which almost completely circumscribes the interconnected stationary member 48A and motor housing 100. A single bolt 122 is tightenable to create a circumferential force about the V-clamp 106. Similarly, the bolt 120 is loosenable to selectively loosen the band 120 and the inverted V-shaped sleeve portion 118 to allow removal of the motor housing 100 with respect to the stationary member 48A. Thus the drive motor 14 may be removed from the remainder of the transmission 12 shown in FIG. 1 for servicing of the drive motor 14. The axial clamp 116 securing the steer motor 16 to the stationary member 48B functions in a similar manner as the axial V-clamp 106, utilizing a single bolt for tightening or loosening the securement of the clamp 116 to allow securement or removal of the steer motor 16.

As used herein, the stationary members 48A, 48B, 48C, 48D and 48E may be a single cast housing circumscribing respective gears and planetary gear sets. Alternatively, the stationary members 48A-48E may be separate members, i.e., separate housing and/or cover portions of the transmission 12, welded or otherwise fastened or secured with respect to one another.

While the best mode for carrying out the invention has been described in detail, those familiar with the art to which this invention relates will recognize various alternative designs and embodiments for practicing the invention within the scope of the appended claims.

The invention claimed is:

1. An electro-mechanical transmission comprising:
   an electric propulsion motor;
   an electric steer motor;
   first and second final drive mechanisms; wherein said propulsion motor and said steer motor are operatively connected with said final drive mechanisms;
   an input differential gear set;
   a first and a second torque transmitting mechanism;
   wherein said propulsion motor is operatively connectable with said final drive mechanisms and said input differential gear set via selective engagement of said first and second torque transmitting mechanisms to establish first and second speed ratios, respectively, across said input differential gear set.

2. The electro-mechanical transmission of claim 1, wherein said input differential gear set has a first, a second and a third member;
   wherein said first torque transmitting mechanism is a brake selectively engagable to ground one of said members of said input differential gear set to a stationary member; and
   wherein said second torque transmitting mechanism is a clutch selectively engagable to connect any two of said members of said differential gear set with one another.

3. The electro-mechanical transmission of claim 1, wherein said input differential gear set has a first, a second, and a third member;
   wherein said first member is continuously connected with said propulsion motor, said second member is selectively connected with said first member via said second torque transmitting mechanisms and with a first stationary member via said first torque transmitting mechanism; and further comprising:
   an output cross shaft operatively connected with said first and second final drive mechanisms and positional axially therebetween;
   wherein said third member is operatively connected with said output cross shaft.

4. The electro-mechanical transmission of claim 3, further comprising:
   first and second combining differential gear sets each having a first, a second, and a third member;
   wherein said first member of each said first and second combining differential gear sets is continuously connected with said output cross shaft;
   wherein said second member of each said first and second combining differential gear sets is operatively connected with said steer motors; and
   wherein said third member of each said first and second combing differential gear sets is operatively connected with said first and said second final drive mechanisms, respectively.

5. The electro-mechanical transmission of claim 4, further comprising;
   a first brake selectively engagable to ground said third member of said first combining differential gear set with one of said first stationary member and a second stationary member; and
   a second brake selectively engagable to ground said third member of said second combining differential gear set with one of said first stationary member, said second stationary member and a third stationary member.

6. The electro-mechanical transmission of claim 5, wherein said respective stationary member to which said respective third members are grounded circumscribes said respective combining differential gear sets.

7. The electro-mechanical transmission of claim 3, further comprising:
   a steer cross shaft offset from and substantially parallel with said output cross shaft; and
   wherein said steer motor is operatively connectable with said first and second final drive mechanisms via said steer cross shaft.

8. The electro-mechanical transmission of claim 1, further comprising:
   a motor housing circumscribing at least one of said motors;
   a stationary member; and
   an axial clamp;
   wherein said motor housing is connectable to said stationary member via said axial clamp; wherein said axial clamp is tightenable to secure said motor housing to said stationary member and releasable to release said motor housing from said stationary member; wherein said axial clamp is accessible from outside of said motor housing and said stationary member, thereby permitting removal of said motor from said stationary member for serviceability.

9. An electro-mechanical transmission comprising:
   an electric propulsion motor;
   an electric steer motor;
   a first and a second final drive mechanism; wherein said propulsion motor and said steer motor are operatively connectable with said first and second final drive mechanisms;
   an output cross shaft operatively connected with said first and second final drive mechanisms and axially therebetween;
   an input differential gear set connected between said propulsion motor and said output cross shaft;
   a first torque-transmitting mechanism selectively engagable to establish a first speed ratio through said input differential gear set;
   a second torque transmitting mechanism selectively engagable to establish a second speed ratio through said input differential gear set; said input differential gear set and said first and second torque-transmitting mechanisms thereby establishing a two-speed range package between said propulsion motor and said final drive mechanisms.

10. The electro-mechanical transmission of claim 9, wherein said input differential gear set has a first, a second and a third member;
   wherein said first torque transmitting mechanism is a brake selectively engagable to ground one of said members of said input differential gear set to a stationary member; and
   wherein said second torque transmitting mechanism is a clutch selectively engagable to connect any two of said members of said differential gear set with one another.

11. The electro-mechanical transmission of claim 9, wherein said input differential gear set is a planetary gear set having a ring gear member, a sun gear member, and a carrier member;
   wherein said first torque-transmitting mechanism is a brake selectively engagable to ground said ring gear member to a stationary member;
   wherein said second torque-transmitting mechanism is a clutch selectively engagable to connect any two of said members of said planetary gear set.

12. The electro-mechanical transmission of claim 9, wherein said input differential gear set has a first, a second, and a third member;
   wherein one of said members of said input differential gear set is operatively connected with said propulsion motor;
   wherein another of said members of said input differential gear set is operatively connected with said output cross shaft, and further comprising:
   a first combining planetary gear set having a first, a second, and a third member; and
   a second combining planetary gear set having a first, second, and a third member;
   wherein said first combining planetary gear set is connected between said output cross shaft and said first final drive mechanism; wherein said second combining planetary gear set is connected between said output cross shaft and said second final drive mechanism;
   wherein said output cross shaft is connected to said first member of each of said respective combining planetary gear sets;
   wherein said steer motor is operatively connected to said second member of each of said respective combining planetary gear sets; and
   wherein said third member of said first combining planetary gear set is operatively connected with said first final drive mechanism and said third member of said second combining planetary gear set is operatively connected with said second final drive mechanism.

13. The electro-mechanical transmission of claim 12, wherein said first members of said combining planetary gear sets are ring gear members; wherein said second members of said combining planetary gear sets are sun gear members; and wherein said third members of said combining planetary gear sets are carrier members.

14. The electro-mechanical transmission of claim 12, further comprising:
   a first brake selectively engagable to ground said third member of said first combining planetary gear set with a first stationary member; and
   a second brake selectively engagable to ground said third member of said second combining planetary gear set with one of said first stationary member and a second stationary member.

15. The electro-mechanical transmission of claim 14, wherein said respective stationary member to which said respective third members are grounded circumscribes said respective combining planetaries.

16. The electro-mechanical transmission of claim 9, further comprising:
   a steer cross shaft offset from and substantially parallel with said output cross shaft; and
   wherein said steer motor is operatively connectable with said first and second final drive mechanisms via said steer cross shaft.

17. The electro-mechanical transmission of claim 9, further comprising:
   a motor housing circumscribing at least one of said motors;
   a stationary member; and
   an axial clamp;
   wherein said motor housing is connectable to said stationary member via said axial clamp; wherein said axial clamp is tightenable to secure said motor housing to said stationary member and releasable to release said motor housing from said stationary member; and wherein said axial clamp is accessible from outside of said motor housing and said stationary member, thereby permitting removal of said motor from said stationary member for serviceability.

18. An electro-mechanical transmission comprising:
   a propulsion motor module having a propulsion motor housing encircling a propulsion motor; wherein the propulsion motor has a stator and a rotor;
   a steer motor module having a steer motor housing encircling a steer motor; wherein the steer motor has a stator and a rotor;
   first and second final drive mechanisms;
   wherein said propulsion motor and said steer motor are both operatively connectable with said final drive mechanisms;
   at least one stationary member at least partially surrounding at least one of said final drive mechanisms and axially abutting one of said motor housings; and
   an axial clamp circumscribing abutted portions of said one of said motor housings and said at least one stationary member and tightenable for selectively connecting said one of said motor housings to said at least one stationary member and releasable for selectively releasing said one of said motor housings from said at least one stationary member.

19. The electro-mechanical transmission of claim 18, wherein said axial clamp is a first axial clamp; wherein said at least one stationary member includes a first stationary member and a second stationary member; wherein said first stationary member is connected with said one of said motor housings via said first axial clamp, wherein said second stationary member axially abuts the other of said motor housings, and further comprising:
   a second axial clamp circumscribing abutted portions of the other of said motor housings and said at least one stationary member and tightenable for selectively connecting the other of said motor housings to said second stationary member and releasable for selectively releasing said other of said motor housings from said second stationary member.

* * * * *